Sept. 7, 1965    F. ECKERT-GREIFENDORFF ETAL    3,205,022
ENDLESS TRACK WITH SPEED COMPENSATION MEANS
Filed March 1, 1963                                    10 Sheets-Sheet 1

Fig.1

INVENTORS
F Eckert-Greifendorff & H. Hörstermann
BY
ATTYS.

United States Patent Office 3,205,022
Patented Sept. 7, 1965

3,205,022
ENDLESS TRACK WITH SPEED
COMPENSATION MEANS
Fritz Eckert-Greifendorff, 94 Hofchensweg, Aachen, Germany, and Heinrich Hörstermann, Hartegasse, Bezirk Cologne, Germany
Filed Mar. 1, 1963, Ser. No. 262,117
Claims priority, application Germany, Mar. 3, 1962,
E 22,481
20 Claims. (Cl. 305—19)

This invention relates to an arrangement for driving chain wheels and the like such, for example as those used in track laying vehicles, chain conveyors and the like and more particularly to a means for controlling the effective shape of the periphery of chain driven vehicle wheels.

The drive wheels of vehicles employing chain drives, with the exception of polygonal sprocket wheels, are usually completely circular. The radius and diameter of such drive wheels is the same in any position of the wheels. Moreover, such wheels all have a completely unbroken periphery. The constant diameter of drive wheels for chains restricts the speed of the drive and in drive wheels for vehicles this fixed diameter is responsible for the wheels having a tendency to dig themselves into the ground. This is due to the fact that the drive wheels are in point contact with the surface upon which they rest. The load is concentrated at this point and, especially in the case of heavy vehicles such as tractors, this is a drawback because the weight and pressure of the wheels extrude the oxygen from the soil and thereby impair its fertility. In deflecting wheels for chains the links of the chain bear tangentially on the theoretical geometric periphery of the deflecting wheels and give rise to irregularities of motion which causes the chains to whip, that is to say, to lash up and down in the plane of the chain and to generate considerable periodic variations in speed in its direction of travel. This also applies to endless and track-laying vehicles. Again the speed of the chain is limited by its tendency to build up violent motion. The speed of travel of chain driven vehicles is restricted accordingly.

Attempts have previously been made to overcome this difficulty by designing so-called non-accelerational chain drives. To this end it has been proposed to use a polygonal chain wheel and the chain wheel together with the driving transmission is arranged to oscillate in the longitudinal direction of the chain to compensate for the accelerational forces. Moreover, the provision of cam discs in conjunction with stationary rollers is also known. However, such an arrangement can compensate irregularities of motion in only one plane, namely, in the direction of the linear movement of the chain driving wheels. Since whipping of the chain is not eliminated, no substantial increase in speed is possible.

The present invention relates to an arrangement for driving chain supporting wheels or vehicle wheels, which eliminates the aforesaid drawbacks. The invention is characterized by the interposition, between the wheel disc mounted on the wheel axle and the chain, or in a divided sectionalized wheel periphery, or radially movable transmission members located on the wheel disc and provided on their peripheries with means for entraining the sections forming the periphery of the wheel, or for engaging the chain. These intermediate members cooperate with at least one stationary guiding cam and at least one stationary compensating cam.

This arrangement permits compensation for the angular speed and the speed of travel of the chain running over the deflecting wheel, or of the sections forming the periphery of the wheel, by means of the intermediate members. It is thus possible to achieve smooth and even travel of the track or conveyor chain. This uniformity of speed not only reduces the drive energy required but also permits the chain or the like to be driven at a much higher speed, and increases the overall efficiency. The guidance provided by the guiding and compensating cams, which can be accurately calculated from the angular speeds, controls the radial position of the intermediate members as the wheel disc revolves. At the points where the chain or the like rides onto and off the deflecting wheel the pitch circle determined by the intermediate members is changed in such a way that the speed and acceleration of the individual chain links, or sections of the wheel periphery, will remain constant as they move into and out of the deflecting arc, or that the intermediate members will remain at the same level. The normal deceleration of the chain is thus eliminated by riding onto and off of these intermediate members. The entraining members do not strike the link pins of the chain with any material impact but gently engage the chain and carry it around from the entry to the exit side at uniform speed. Entry of the chain on the chord thus provided has the advantage that the preceding entraining member is not loaded when it turns but that it will immediately resume guiding the chain, whereas the following entraining member takes over the load and guides the chain during the turning motion.

In the case of a vehicle wheel each intermediate member guided by the cams is preferably arranged to support a pivotably mounted peripheral wheel section. The peripheral wheel sections are enclosed in a sheath of elastic material, which may take the form of a tire enclosing all the peripheral sections of the wheel together. However, instead of carrying a sheath or tire the wheel may cooperate with another wheel in spaced relationship thereto for carrying a caterpillar track or a track chain. Additionally, the sections forming the wheel periphery may be attached to link rods or strap links connecting the sections together. The forward motion of such a wheel with a sectionalized periphery takes place in that the wheel disc which rolls on the chord or preferably on the produced chord, lays the belt or track chain on the ground, rolling thereon and then lifts up the sections by picking them up at the rear. In other words, a single wheel constructed according to this invention accomplishes the same function which in track laying vehicles can be done only by the provision of at least two wheels. In a vehicle wheel according to this invention it is preferred to form the guide and compensating cams so that they also deviate from a circle in the region diametrically opposite the region where the wheel rolls on the ground, the object being to balance the masses and to avoid creating an unbalanced couple. Since in this region the intermediate members travel along a chord of the pitch circle, the peripheral wheel sections may perform an accelerated turning motion when the wheel rolls on the ground. Consequently the usual point contact is replaced by wide surface contact with the ground.

Preferably each intermediate member is guided by at least one pair of rollers, each roller running over one of the cams. At least one of the cams preferably provides a completely closed track. The may takes the form of a radially bounded slot in the vehicle frame or in a stationary bearing member. For reasons of symmetry it is desirable to provide guide cams and compensating cams in pairs on each side of the wheel disc, either side by side or the one above the other. The rollers engaging the cam slots are conveniently relatively offset in the direction of travel of the intermediate member.

The intermediate member itself is located by a projection which slidably engages a corresponding recess in the wheel disc and is thus entrained by the wheel disc. It is also desirable to provide means for keeping the intermediate members in peripheral alignment, for instance by providing a projection on each intermediate member for engaging a slot in the preceding intermediate member or, alternatively by the provision of connecting links or strap members.

The invention will now be more particularly described by reference to three embodiments illustrated in the drawings in which.

Similar reference characters refer to similar parts throughout the several views of the drawings.

In the form of the invention disclosing a chain drive illustrated in FIGS. 1 to 5, a wheel disc 2 is secured to a drive shaft 1 and is intended to function as a guide wheel for a chain 3. The chain 3 does not directly engage the wheel disc 2 because, according to this invention, a set of intermediate transmission members 6 is interposed between the chain and disc. Each of these intermediate members 6 has a projection 7 which is located between suspension arms 9 of the intermediate member, and which is slidably held in recesses 2a in disc 2 having parallel side walls 8. The outside radial face of intermediate member 6 has a serrated or toothed ridge 11 with a contour forming saddles 12 for the reception therein of the link pins 5 of the chain. For retaining consecutive intermediate members 6 in exact peripheral alignment each intermediate member has a protuberance 13 which engages a slot 14 in the adjacent intermediate member 6. Alternatively, guide means of some other kind might be provided for keeping the intermediate members aligned.

Symmetrically on each side of its center axis the intermediate members 6 carries a roller 16 overhung on a shaft 15 mounted in suspension arms 9. Each intermediate member is further provided with rollers 17 overhung on a shaft 18 which is also mounted in the intermediate member 6. Rollers 17 and rollers 16 are relatatively offset in the direction of travel. Each roller 17 is guided along a compensating cam edge 19 which is constituted by an annular slot 21 in casing 20 of a bearing frame. The bearing frame is a fixed assembly, for instance bolted to a bedplate 22 on the ground. Each roller 16 runs in a cam slot 23 which likewise forms a closed annular track for the roller. Cam slot 23 is likewise fixed and may be formed by and contained in the same casing 20.

The intermediate members 6 affect the angular speed of the chain as it runs onto the wheel in such manner that the angular speed and the speed of entry into section 24 are substantially equal. By suitably designing the cam slot 23 and the compensating slot 19 it is possible to ensure, for example, that the axis of link pin 5 of the chain will run onto the deflecting wheel along a projected chord 24 of pitch circle 25 (see FIG. 1). To this end the intermediate member performs upward and downward tilting motions which are caused by the rollers 16 riding in cam slot 23. The intermediate member 6 is also positively guided by the rollers 17 riding in the cooperating cam slots 19. The supplementary guiding action of cam slot 19 compensates for the accelerations and decelerations otherwise experienced by chain 3 when running onto and off the wheel. The decisive factor is the appropriate cooperation of the three fulcra A, B, and C thus described. As will be understood from FIG. 1 the cams are so designed that the length of the chord 24 is the length of the synchronized entry section, which equals the length of the chain links 3. Angle 26 is subtended by a chord on the pitch circle 25 equal in length to a link of the chain. Within the said angle the guiding cam edge 23 is slightly recessed. On the other hand, the compensating cam edge 19 has a low wall in a region before entering this angle but rises again within the confines of the angle. Since the intermediate member 6 runs on two pairs of rollers 16 and 17 which are peripherally offset, point A, i.e. the axis of link pin 5, is guided along the chord 24 and all points A will maintain a constant relative distance. A similar arrangement is provided where the chain runs off the wheel at 27. In the arcuate section between run-in and run-off both cam edges lie on the same arc. The two cam edges can be easily so arranged that the speed of the chain remains the same when running onto the wheel prior to deflection or turning and when running off the wheel after turning.

The transmission means incorporated in the guiding or deflecting wheel of a chain, as illustrated in FIGS. 1 to 5, can be applied with equal advantage to the driven wheel of a vehicle, such as a tractor or the like. The intermediate members 6 in such an arrangement guide a plurality of separate peripheral sections which together form the tread of the wheel. An embodiment of this idea is illustrated in FIGS. 6 to 8.

Figure 1:
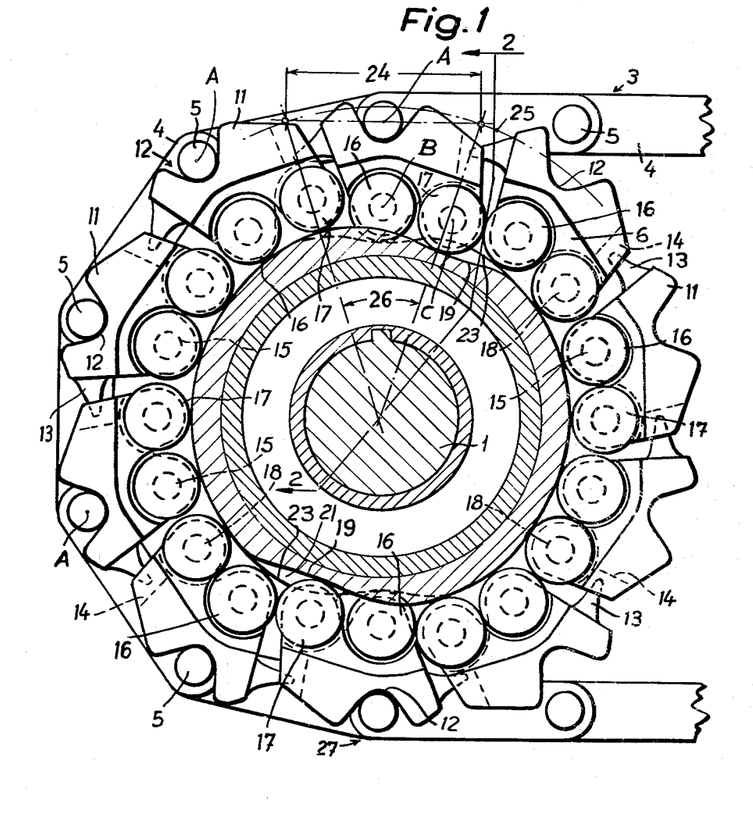
FIG. 1 is a cross-sectional view of one form of the instant invention taken on the line 1—1 of FIG. 1.
Figure 2:
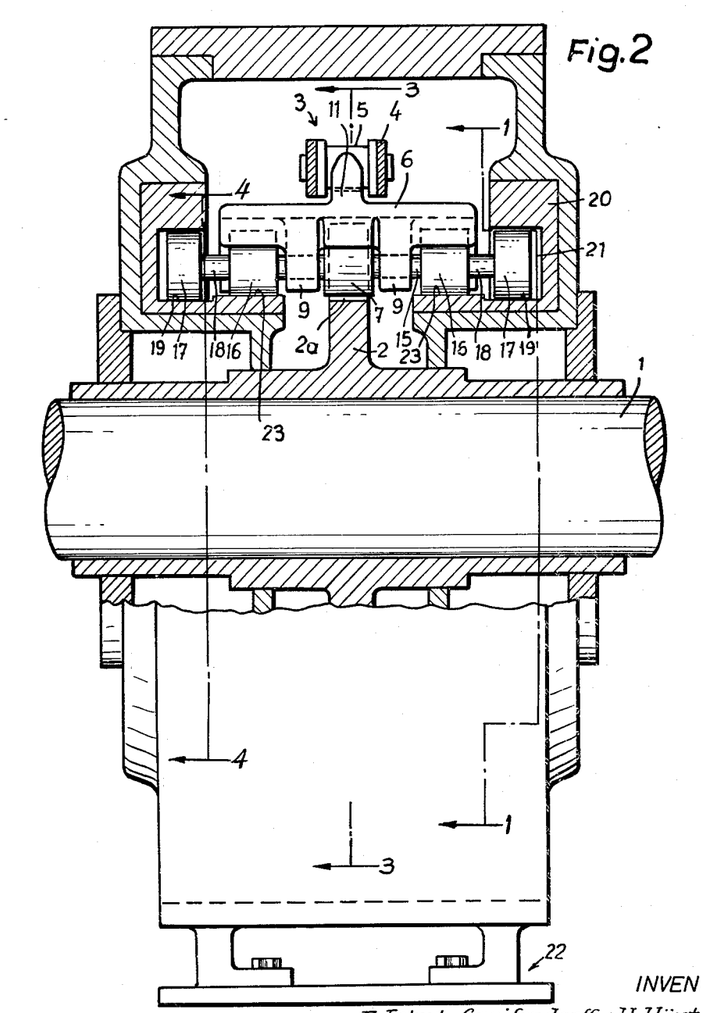
FIG. 2 is an end elevational view of the invention partly broken away along the line 2—2 of FIG. 1.
Figure 3:
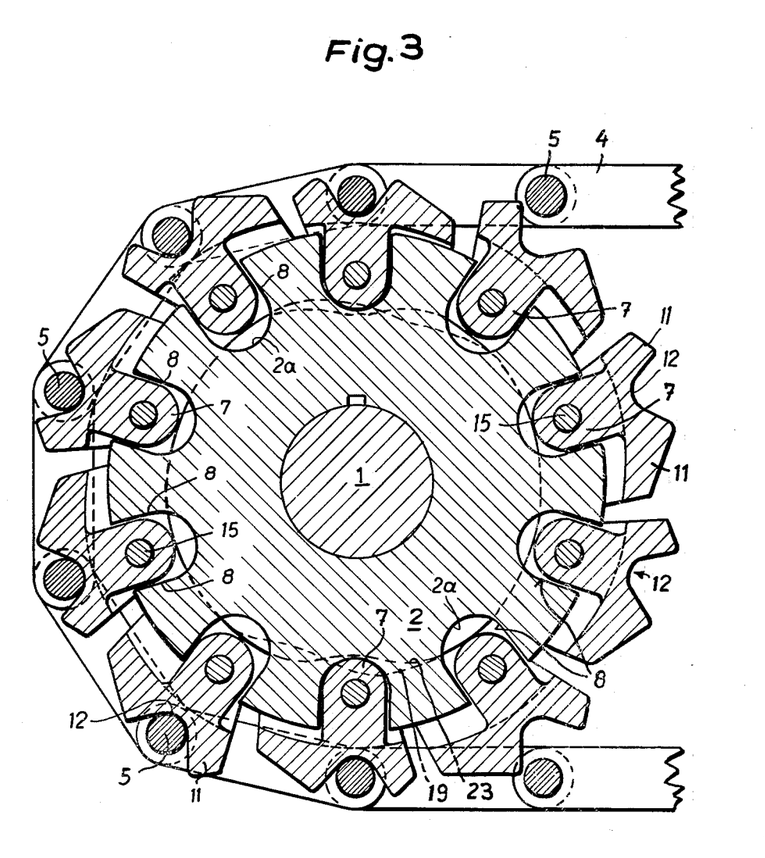
FIG. 3 is a sectional view taken substantially along the line 3—3 of FIG. 2, as viewed in the direction of the arrows.
Figure 4:
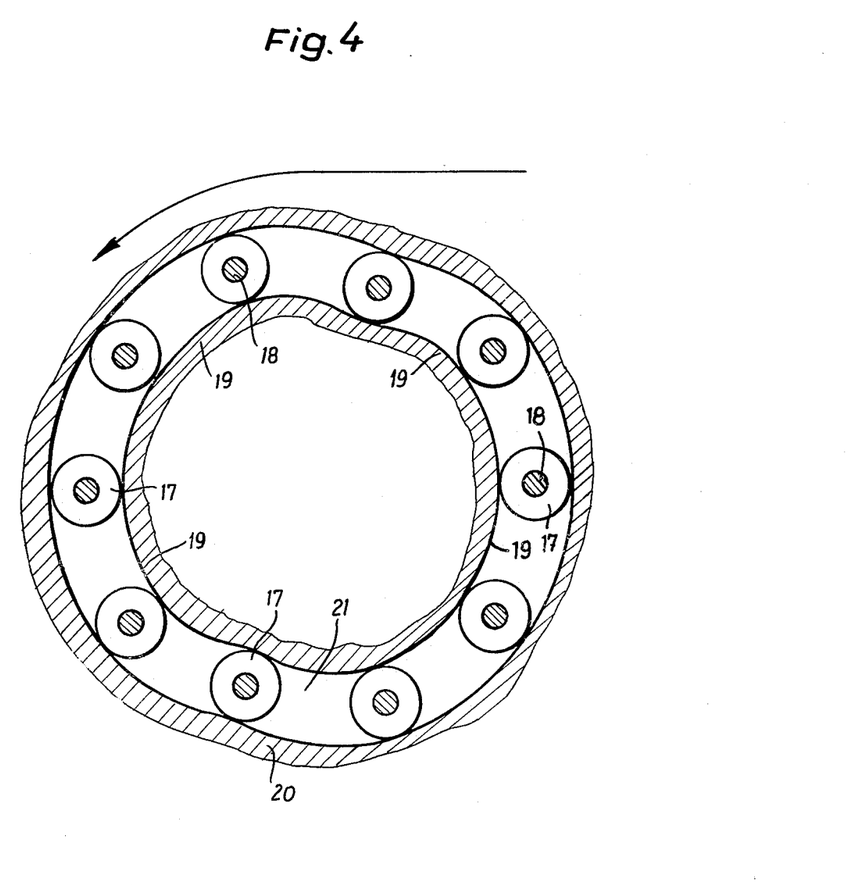
FIG. 4 is a fragmentary sectional view taken substantially along the line 4—4 of FIG. 2 as viewed in the direction of the arrows.
Figure 5:
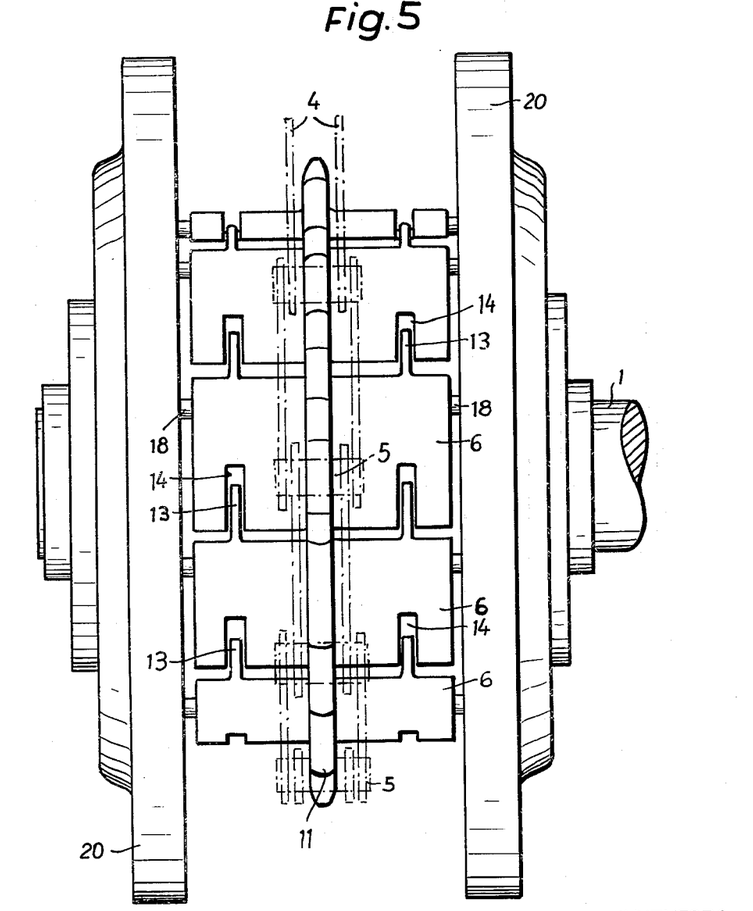
FIG. 5 is a top plan view of the construction shown in FIGS. 1 and 2.
Figure 6:
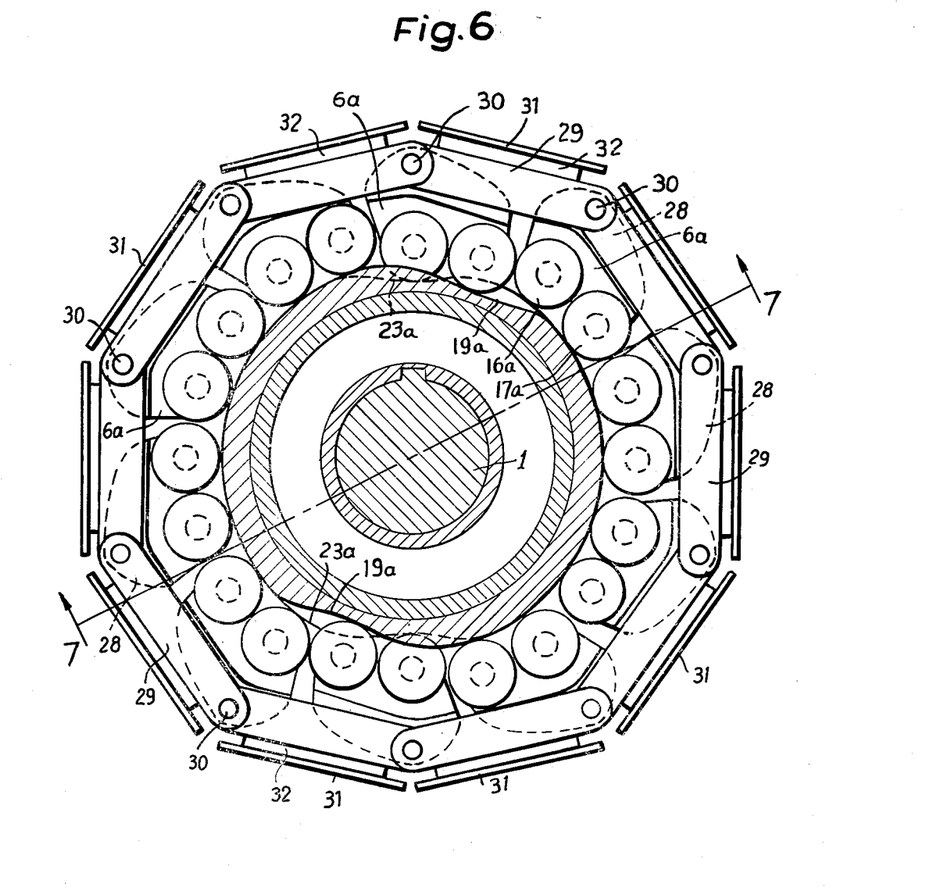
FIG. 6 is a cross-sectional view of a modified form of construction, taken on the line 6—6 of FIG. 7.
Figure 7:
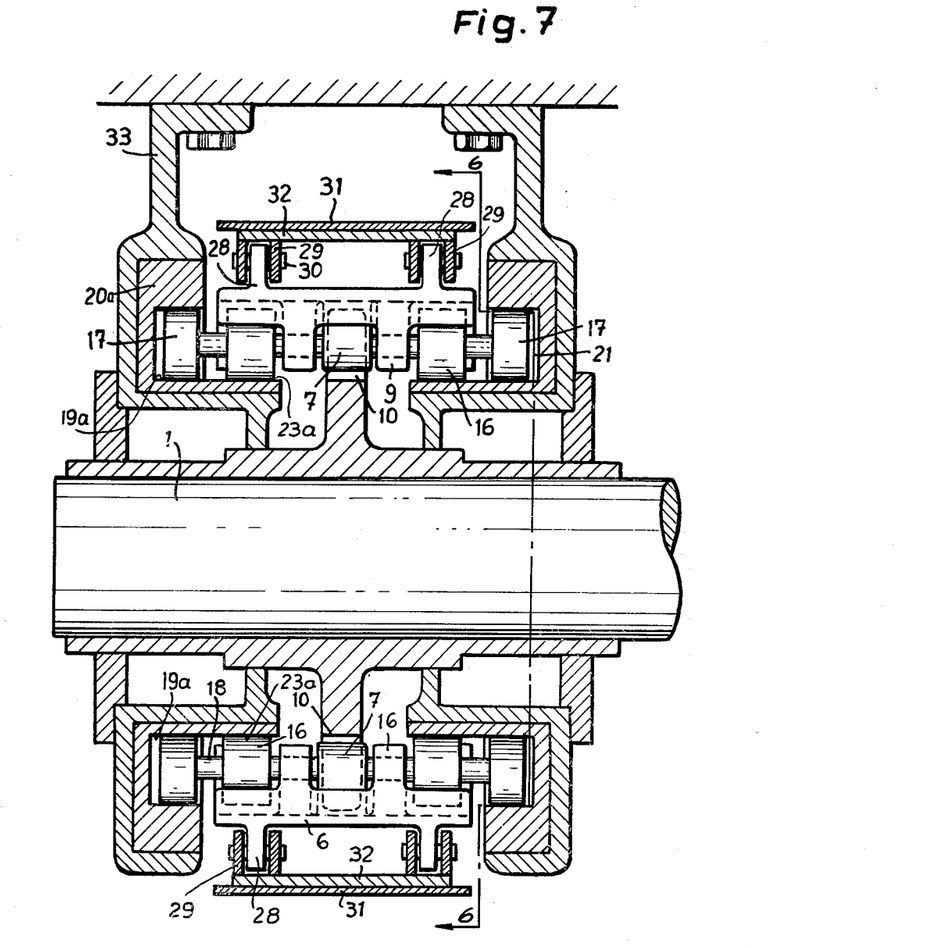
FIG. 7 is a sectional view taken substantially along the line 7—7 of FIG. 6 as veiwed in the direction indicated by the arrows.
Figure 8:
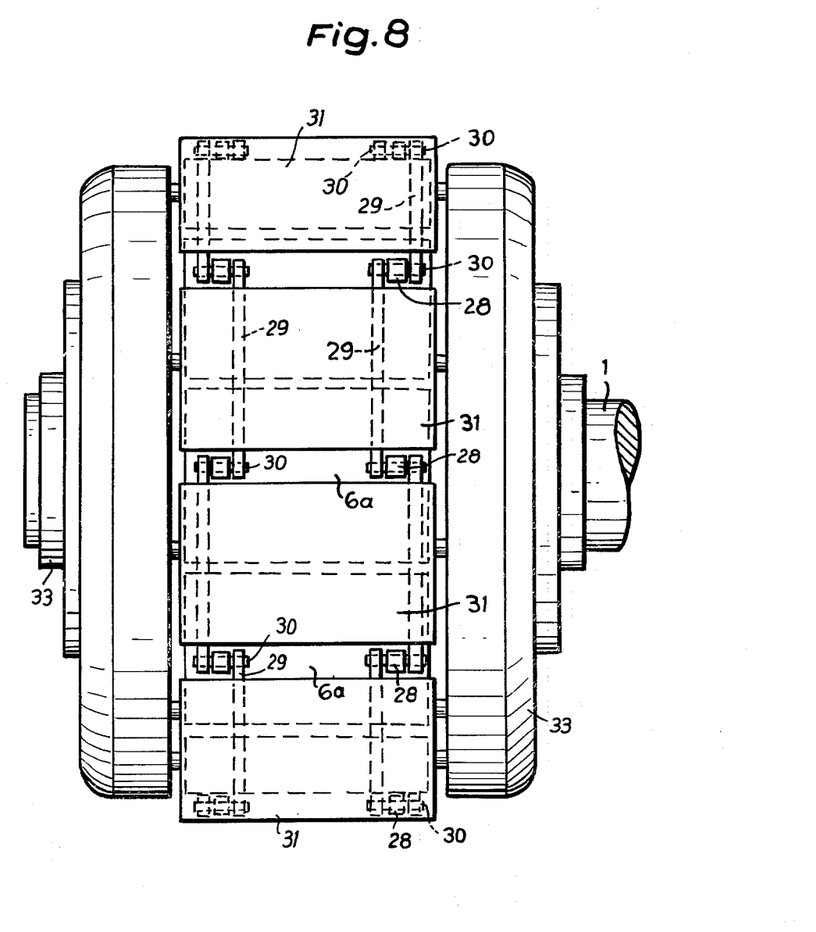
FIG. 8 is a top plan view of the modified form of the invention disclosed in FIGS. 6 and 7.

By reference to FIGS. 6 to 8 it will be seen that the intermediate members 6a have protruding ridges forming lugs 28. The intermediate members are connected together by links or plates 29 attached to pivot pins 30 extending through lugs 28. Links 29 are fixed to and support plates 31 which each forms an independent part of the tread. The outside faces of these plates may be flat or they may each form part of a cylindrical surface corresponding to the desired periphery of the wheel. Supplemental supports 32 may be interposed between the plates 31 and the links 29. The casing 20a which is formed with the cam slots 19a and 23a, identical to the slots 19 and 23 which guide the rollers 16a and 17a, is attached to the frame 33 of the vehicle. When the arrangement proposed by the present invention is thus applied to a vehicle wheel the deviation of guiding cam and compensating cam from a circle can be confined to the section of the wheel which contacts the ground, the tread moving along the chord of the pitch circle only when the wheel rolls on the ground. The cam slots 19a and 23a thus provide the same angular equalization of speed during the running in of one section of the links 29 over one of these cam slots and the simultaneous running out of another section of the links 29 over the diametrically opposite of these cam slots.

Figure 9:
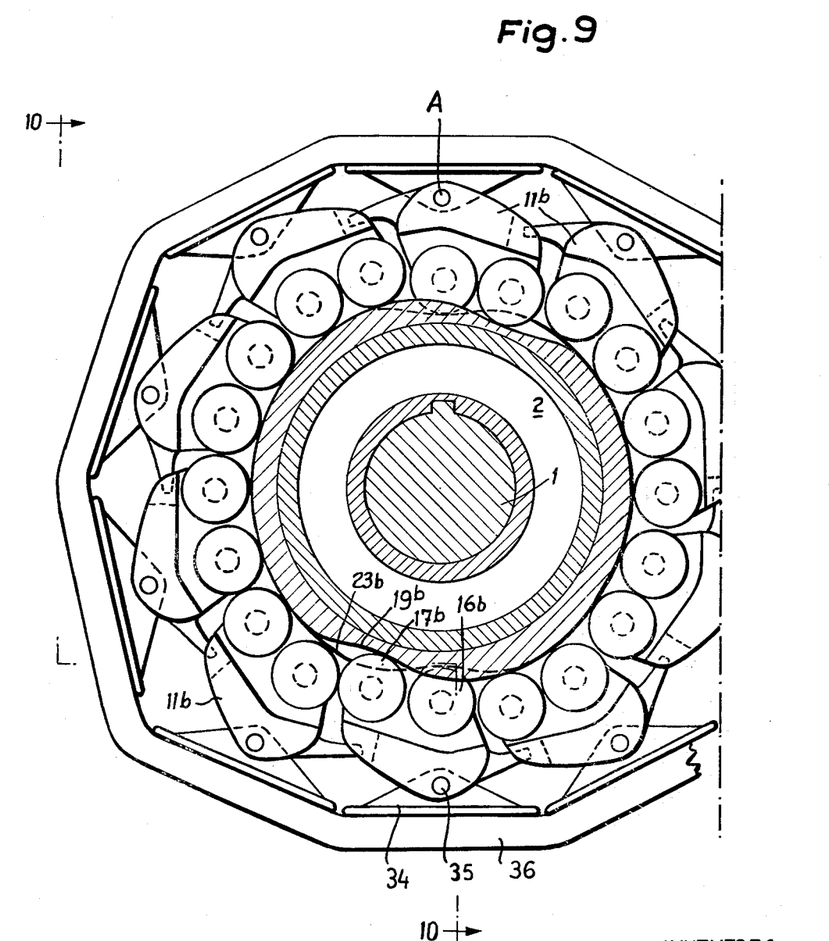
FIG. 9 is a cross-sectional view of a still further modified form of construction.
Figure 10:
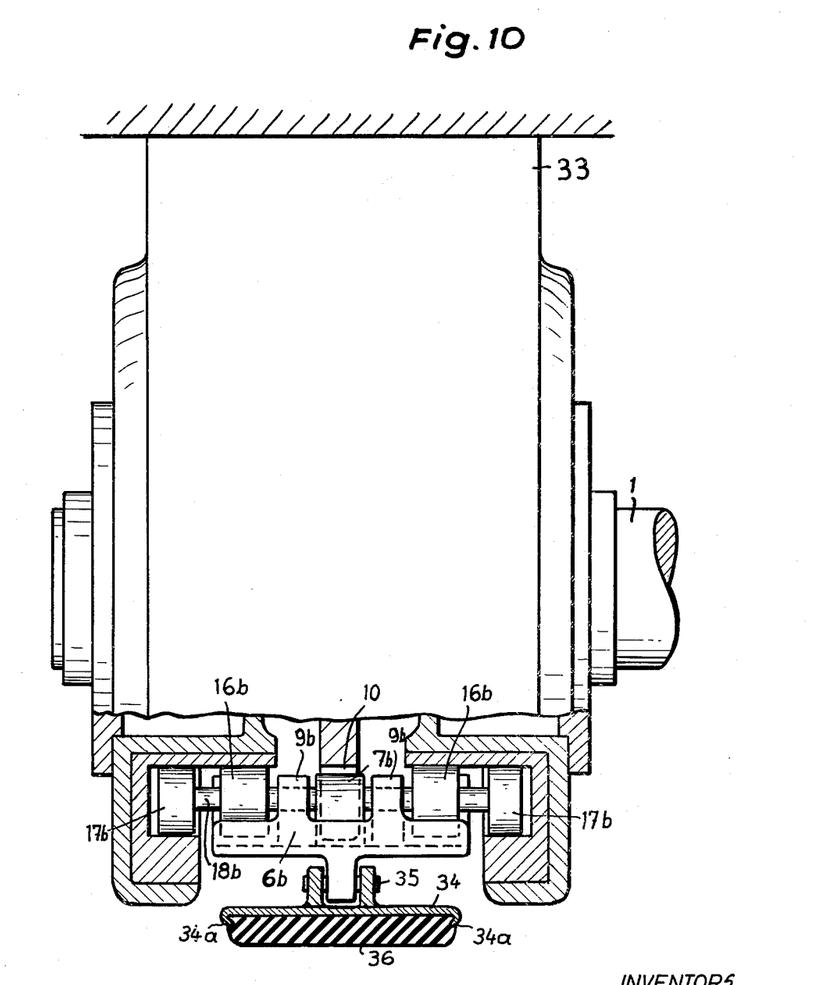
FIG. 10 is an end view, as seen from the left, partially sectioned along the line 10—10 of FIG. 9, of the construction of FIG. 9.

FIGS. 9 and 10 illustrate another embodiment of the invention applied to a vehicle wheel. The toothed ridge 11b of the intermediate member 6b pivotably carries peripheral plates 34 on pivot pins 35. The pin 35 of each plate 34 is located in radial alignment with projection 7b at point A when the guiding cam edge and the compensating cam edge coincide on a common arc of a circle. Cam slots 19b and 23b accommodate rollers 16b and 17b in a manner identical to that previously described. Preferably the plates 34 which are deflectably mounted on a single pivot pin are all embraced by a tire 36 forming the peripheral tread of the wheel. This tire 36 may be an annular cover embracing all the plates of one wheeel and consisting of an elastic material, such as rubber, plastic or the like. The outside peripheral face of each plate 34 may be flat so that the tire 36 is deformed into polygonal shape. Alternatively, the outside faces of the plates 34 may be parts of a cylinder and together define a completely cylindrical periphery so that the tire will also assume cylindrical shape. Conveniently the plates 34 may be shaped in section in the manner of a wheel-base rim, as indicated in FIG. 10, the tire 36 being held in position by the flanged edges 34a of the rim 34. Moreover, the tread of the tire 36 may have any desired profile for improving its grip.

In this form of construction the guiding and compensating cams may likewise be so designated that the section in contact with the ground travels along a chord or projected chord of the pitch circle. The length of the tire always remains the same when the wheel according to the invention rolls on the ground. This means that the tire is not peripherally stretched. Compensation is effected by the controlled motion of the plates 34 in the region where the wheel rolls on the ground.

Another suitable field of application for the drive means proposed by the invention arises in platform or apron conveyors. Whereas in normal chain drives the speed of the chain running onto and off the wheel is synchronized with the linear speed of the chain the cams provided in equipment according to the invention may be so contrived as to generate a deliberate degreee of asynchronism on the wheel. In a platform conveyor this may be an advantage because on a level path the plates slightly overlap. By suitably designing the guiding and compensating cams according to the invention each plate running onto the return wheel of the platform conveyor may be slightly accelerated to draw it clear of its overlap with the following plate. This also permits each plate to be guided on the wheel by parts moving substantially parallel to the plate, preferably in a substantially horizontal or slightly tilted position, to the level of the return strand. When the plate which is thus conducted over the wheel runs off the wheel the cams may again be suitably designed to accelerate the plate sufficiently to reestablish overlap with the preceding plate. An arrangement of this kind saves space in relation to the conventional method of reversal of platform conveyors on the return wheels.

What is claimed is:

1. Apparatus for compensating for inequalities in the speed of travel of sections of a rotary device occasioned by contact with a stationary surface, said apparatus including a driving wheel, surface contacting elements and a drive shaft for the wheel, intermediate transmission members radially and circumferentially movable relative to said wheel, means carried by said transmission members for operatively engaging said surface contacting elements, said transmission members including at least two circumferentially spaced and axially offset cam followers, at least one fixed cam groove engageable with one of said cam followers and at least one compensating cam groove engaged by the other of said cam followers, said groove and followers combining to form means for substantially equalizing at all times the angular speed of the surface contacting elements during running in and running out of the surface contacting elements relative to the cam groove.

2. The structure of claim 1 wherein the surface contacting elements comprise pivoted peripheral sections.

3. The structure of claim 1 wherein the surface contacting elements comprise an endless track.

4. The structure of claim 1, wherein the cam followers comprise pairs of rollers and each roller is guided by one of the cam grooves, at least one of which forms a completely closed track.

5. The structure of claim 1, wherein the compensating cam groove is a radially bounded slot in a stationary bearing member.

6. The structure of claim 5, wherein the guiding cam groove and the compensating cam groove are located side by side on one side of the driving wheel, said wheel being rotatably mounted in the bearing member.

7. The structure of claim 6, wherein the guiding cam groove and the compensating cam groove are provided in pairs on both sides of the driving wheel.

8. The structure of claim 7, wherein rollers which ride in the cam grooves are offset relative to each other in the direction of travel of the intermediate member.

9. The structure of claim 8 wherein each intermediate member has a projection which slidably engages a recess in the driving wheel.

10. The structure of claim 9 wherein the intermediate members are retained in relative alignment by a projection on one intermediate member engaging in a slot in the adjacent intermediate member.

11. The structure of claim 10, wherein the intermediate members are interconnected by bifurcated articulating links.

12. The structure of claim 11, wherein a toothed ridge on the intermediate member is formed with saddle-shaped recesses for the reception of link pins of a chain, the recesses in consecutive members being retained in equidistantly spaced relation by said cam grooves.

13. The structure of claim 11, wherein the links which interconnect the intermediate members support plate sections which together form the periphery of the wheel.

14. The structure of claim 11 wherein the surface contact element engaging means on the intermediate member takes the form of a toothed ridge providing a lug to which sectional plates forming the wheel periphery are pivotally attached, and wherein the pivots of the plate sections are located at equidistantly spaced points.

15. The structure of claim 14, wherein the plate sections which form the wheel periphery are enclosed in a tire of elastic material.

16. The structure of claim 15 wherein the tire forms an unbroken peripheral tread which encloses all of said plate sections.

17. The structure of claim 15, wherein a continuous articulated track runs over at least two relatively spaced wheel discs provided with peripheral plate sections.

18. The structure of claim 3, wherein the guiding and compensating cam grooves on an endless track drive deviate from a circle in the regions where the chain runs onto and off of the wheel so that effective radius of the wheel remains unchanged.

19. The structure of claim 18 wherein the cam groove contours are so arranged that the means carried by the transmission members gradually engage the chain from underneath and carry the same at constant speed around the wheel from the point of run-in to the point of run-out.

20. The structure of claim 19 including an element entrained about the chain which tilts without taking up the load when the chain rides onto the wheel along projected chord of the chain and after having tilted immediately engages the chain, the following entraining element having taken up the load and guiding the chain in the meantime.

References Cited by the Examiner

UNITED STATES PATENTS

| 130,892 | 8/72 | Brown | 305—2 X |
| 373,887 | 11/87 | Fender | 305—2 X |
| 382,079 | 5/88 | Ewart | 74—244 X |

ARTHUR L. LA POINT, *Primary Examiner.*

DON A. WAITE, *Examiner.*